United States Patent
Yellin (10) Patent No.: US 9,608,746 B1
(45) Date of Patent: Mar. 28, 2017

(54) DETECTING DEVIATION IN BROADCASTING DEVICE PROPERTIES

(71) Applicant: International Business Machines Corporation, Armonk, NY (US)

(72) Inventor: Daniel M. Yellin, Raanana (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/943,074

(22) Filed: Nov. 17, 2015

(51) Int. Cl.
- *H04W 4/02* (2009.01)
- *H04H 20/61* (2008.01)
- *H04W 4/00* (2009.01)
- *H04H 20/71* (2008.01)

(52) U.S. Cl.
CPC ............ *H04H 20/61* (2013.01); *H04H 20/71* (2013.01); *H04W 4/008* (2013.01)

(58) Field of Classification Search
CPC ..... H04W 4/008; H04W 24/00; H04W 24/04; H04W 88/18; H04H 20/61; H04H 20/71
USPC .......................... 455/41.2, 414.2, 418, 435.1
See application file for complete search history.

(56) References Cited

U.S. PATENT DOCUMENTS

| | | | |
|---|---|---|---|
| 7,283,093 B2 | 10/2007 | Do et al. | |
| 8,396,485 B2 | 3/2013 | Grainger et al. | |
| 9,398,852 B2 * | 7/2016 | Enomoto | A61B 5/0006 |
| 2011/0119222 A1 | 5/2011 | Rosinski | |
| 2011/0306361 A1 | 12/2011 | Alizadeh-Shabdiz et al. | |
| 2014/0370917 A1 | 12/2014 | Buchheim et al. | |
| 2016/0057613 A1* | 2/2016 | Hines | H04W 8/22 455/419 |
| 2016/0205654 A1* | 7/2016 | Robinson, Jr. | B64C 39/024 455/456.3 |

OTHER PUBLICATIONS

Boden, Rian, "Ubudu turns beacons into two-way communications devices", NFC World+, Dec. 15, 2014, printed on Aug. 25, 2015, Copyright © 2008-2015 SJB Research Ltd., 4 pages, <http://www.nfcworld.com/2014/12/15/333220/ubudu-turns-beacons-two-way-communications-devices/>.
Levine, Barry, "Move over iBeacons—here come mesh beacons", Venture Beat, Marketing (http://venturebeat.com/category/Marketing/), Dec. 6, 2014, Printed on Aug. 25, 2015, 9 pages, <http://venturebeat.com/2014/12/06/move-over-ibeacons-here-come-mesh-beacons/>.
Noble, Kevin, "Detecting Malicious Beacons", Deviant Packets, Tuesday, Mar. 11, 2014, Printed on Aug. 25, 2015, 5 pages, <http://deviantpackets.blogspot.com/2014/03/detecting-malicious-beacons.html>.

(Continued)

*Primary Examiner* — Blane Jackson
(74) *Attorney, Agent, or Firm* — Kyle J. Eaton (57) ABSTRACT

A computer-implemented method includes identifying a broadcasting device. The broadcasting device operates via a short-range wireless communication protocol. The computer-implemented method further includes determining one or more affinity indications associated with the broadcasting device. The computer-implemented method further includes determining one or more deviation indicators based on the one or more affinity indications. The one or more deviation indicators are associated with the broadcasting device. A corresponding computer program product and computer system are also disclosed.

14 Claims, 8 Drawing Sheets

(56) References Cited

OTHER PUBLICATIONS

Young, David G., "Fundamentals of Beacon Ranging", Radius Networks, Radius Developers, Dec. 4, 2014, printed on Aug. 25, 2015, 4 pages, © 2015 Radius Networks, <http://developer.radiusnetworks.com/2014/12/04/fundamentals-of-beacon-ranging.html>.

Ubudu, "Micro-location marketing platform built with beacon technology", 2015 © ubudu, printed on Aug. 25, 2015, 8 pages, <http://www.ubudu.com/index.html>.

* cited by examiner

| Line | Application | Device |
|---|---|---|
| 1 | 511 — AP1 | 451 — BD1 |
| 2 | 511 — AP1 | 452 — BD2 |
| 3 | 512 — AP2 | 451 — BD1 |
| 4 | 512 — AP2 | 452 — BD2 |
| 5 | 513 — AP3 | 453 — BD3 |
| 6 | 513 — AP3 | 454 — BD4 |
| 7 | 513 — AP3 | 455 — BD5 |
| 8 | 513    AP3 | 456 — BD6 |
| 9 | 514 — AP4 | 453 — BD3 |
| 10 | 514 — AP4 | 454 — BD4 |
| 11 | 514 — AP4 | 455 — BD5 |
| 12 | 514 — AP4 | 456 — BD6 |
| 13 | 515 — AP5 | 457 — BD7 |
| 14 | 515 — AP5 | 458 — BD8 |
| 15 | 516 — AP6 | 457 — BD7 |
| 16 | 516 — AP6 | 458 — BD8 |

FIG. 5

| Line | Device | LG1 Ratio | LG2 Ratio | LG3 Ratio | Grouping |
|---|---|---|---|---|---|
| 1 | BD1 — 451 | 100% | 000% | 000% | LG1 — 411 |
| 2 | BD2 — 452 | 100% | 000% | 000% | LG1 — 411 |
| 3 | BD3 — 453 | 000% | 100% | 000% | LG2 — 412 |
| 4 | BD4 — 454 | 000% | 100% | 000% | LG2 — 412 |
| 5 | BD5 — 455 | 000% | 100% | 000% | LG2 — 412 |
| 6 | BD6 — 456 | 000% | 100% | 000% | LG2 — 412 |
| 7 | BD7 — 457 | 000% | 000% | 100% | LG3 — 413 |
| 8 | BD8 — 458 | 000% | 000% | 100% | LG3 — 413 |
| 9 | BD9 — 459 | 000% | 000% | 000% | UND |

FIG. 6

| Line | Device | P_Group | E_Group | Status |
|---|---|---|---|---|
| 1 | BD1 — 451 | LG1 — 411 | LG1 — 411 | In Place |
| 2 | BD2 — 452 | LG1 — 411 | LG1 — 411 | In Place |
| 3 | BD3 — 453 | LG1 — 411 | LG2 — 412 | Moved |
| 4 | BD4 — 454 | LG2 — 412 | LG2 — 412 | In Place |
| 5 | BD5 — 455 | LG2 — 412 | LG2 — 412 | In Place |
| 6 | BD6 — 456 | LG2 — 412 | LG2 — 412 | In Place |
| 7 | BD7 — 457 | LG3 — 413 | LG3 — 413 | In Place |
| 8 | BD8 — 458 | LG3 — 413 | LG3 — 413 | In Place |
| 9 | BD9 — 459 | LG3 — 413 | UND | Unknown |

DETECTING DEVIATION IN BROADCASTING DEVICE PROPERTIES

BACKGROUND

The present invention relates generally to the field of managing broadcasting devices operating on short-range wireless communication protocols, and more particularly to detecting deviation in properties of broadcasting devices operating via those protocols.

In computer system environments that include broadcasting devices operating via short-range wireless communication protocols, deviation in the properties of those broadcasting devices can hamper the operation of the computer system environments. Developers and users of computer system environments that include broadcasting devices operating via short-range wireless communication protocols continue to face challenges with the costs associated with the detection of deviation in the properties of those broadcasting devices.

SUMMARY

A computer-implemented method includes identifying a broadcasting device. The broadcasting device operates via a short-range wireless communication protocol. The computer-implemented method further includes determining one or more affinity indications associated with the broadcasting device. The computer-implemented method further includes determining one or more deviation indicators based on the one or more affinity indications. The one or more deviation indicators are associated with the broadcasting device. A corresponding computer program product and computer system are also disclosed.

DETAILED DESCRIPTION

Figure 1:
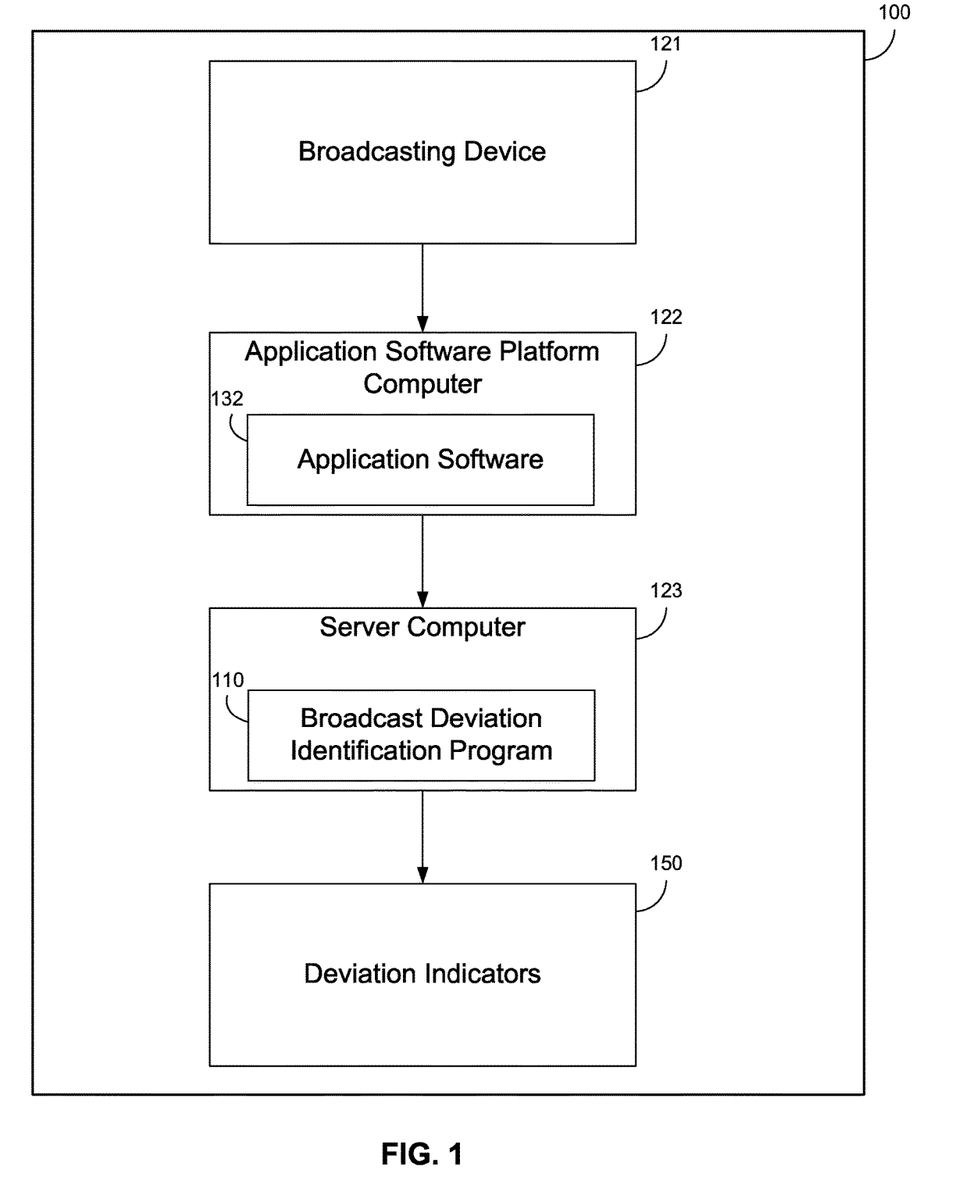
FIG. 1 is a block diagram of one embodiment of a computer system environment suitable for operation of a broadcast deviation identification program, in accordance with at least one embodiment of the present invention.

FIG. 1 is a block diagram of one embodiment of a computer system environment 100 suitable for operation of a broadcast deviation identification program 110, in accordance with at least one embodiment of the present invention. In the computer system environment 100 depicted in FIG. 1, a broadcasting device 121 is any device that, during regular and non-exceptional operations, can communicate using at least one short-range wireless communication protocol, such as a combination of one or more Bluetooth-based protocols (including the classic Bluetooth protocol and the Bluetooth Low Energy protocol), radio frequency identification (RFID) protocols, near-field communication (NFC) protocols, and Wi-Fi protocols. The broadcasting device 121 causes one or more communication indications (i.e., any indication communicated to one or more destinations in regular and non-exceptional operations) to be communicated to an application software 132 stored on and/or executing on an application software platform computer 122. In some embodiments, a communication indication comprises one or more elements selected from the group consisting of one or more broadcasting device identifying indications (e.g., one or more broadcasting device IDs), one or more application software identifying indications (e.g., one or more application software IDs), one or more time indications (e.g., one or more time stamps), and one or more informational indications (e.g., one or more pieces of data about the communication indication). In at least some embodiments, an application software 132 is any combination of one or more software components that is capable of communicating with the broadcasting device 121 via at least one short-range wireless communication protocol. In at least some embodiments, an application software platform computer 122 is any computer platform on which the application software 132 is stored and/or executed. In some embodiments, the application software 132 resides on a mobile device.

In the computer system environment 100 depicted in FIG. 1, the application software 132 causes one or more affinity indications to be communicated to a broadcast deviation identification program 110 stored and/or executing on a server computer 123. In at least some embodiments, a server computer 123 is any computer platform that is capable of communicating with the application software 132 and on which the broadcast deviation identification program 110 is stored and/or executed. In some embodiments, the application software platform computer 122 and the serve computer 123 are the same computer. In some embodiments, the application software 132 and the broadcast deviation identification program 110 are part of the same software component and/or the same software platform comprising one or more software components.

In the computer system environment 100 depicted in FIG. 1, the broadcast deviation identification program 110 uses the one or more affinity indications caused to be communicated to it by the application software 132 to determine one or more deviation indicators 150 associated with the broadcasting device 121. In at least some embodiments, a deviation indicator indicates, in whole or in part and directly or indirectly, whether a particular property of the broadcasting device 121 determined based on its behavior and/or condition (i.e., a particular primary exhibited property of the broadcasting device 121, such as the location of the broadcasting device 121 being in a particular zone of a store) is different from a particular property of the broadcasting device 121 expected to be true of the broadcasting device 121 (i.e., a particular primary predetermined property of the broadcasting device 121). In some embodiments, a primary predetermined property of a broadcasting device is based on one or more pieces of prior information (e.g., about the broadcasting device 121) and/or one or more pieces of prior assumptions (e.g., about the broadcasting device 121).

Figure 2:
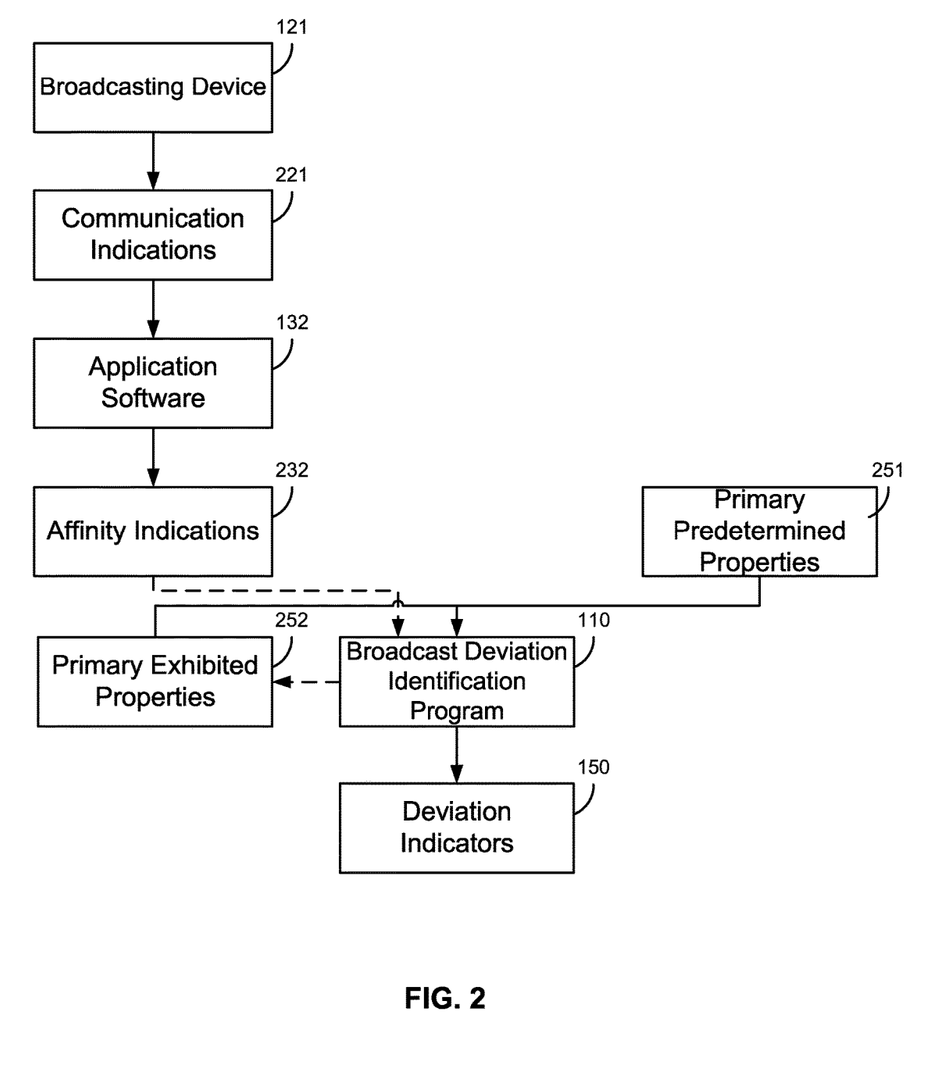
FIG. 2 is a data-flow diagram of a broadcast deviation identification program, in accordance with at least one embodiment of the present invention.

FIG. 2 is a data-flow diagram of a broadcast deviation identification program 110, in accordance with at least one embodiment of the present invention. In the embodiment depicted in FIG. 2, the broadcasting device 121 causes one or more communications indications 221 to be communicated to an application software 132, and the application software 132 causes one or more affinity indications (e.g., determined based on the one or more communication indications 221 caused to be communicated to the application software 132 by the broadcasting device 121) to be communicated 232 to the broadcast deviation identification program 110. The broadcast deviation identification program 110 uses the one or more affinity indications to determine one or more primary exhibited properties 252 associated with the broadcasting device 121 (i.e., one or more properties of the broadcasting device 121 determined based on its behavior and/or conditions).

In the embodiment depicted in FIG. 2, the broadcast deviation identification program 110 compares the one or more primary exhibited properties 252 to one or more primary predetermined properties 251 associated with the broadcasting device (i.e., one or more properties expected to be true of the broadcasting device 121, determined for instance based on one or more pieces of prior information and/or one or more pieces of prior assumptions). The broadcast deviation identification program 110 determines one or more deviation indicators 150 associated with the broadcasting device 121.

Figure 3:
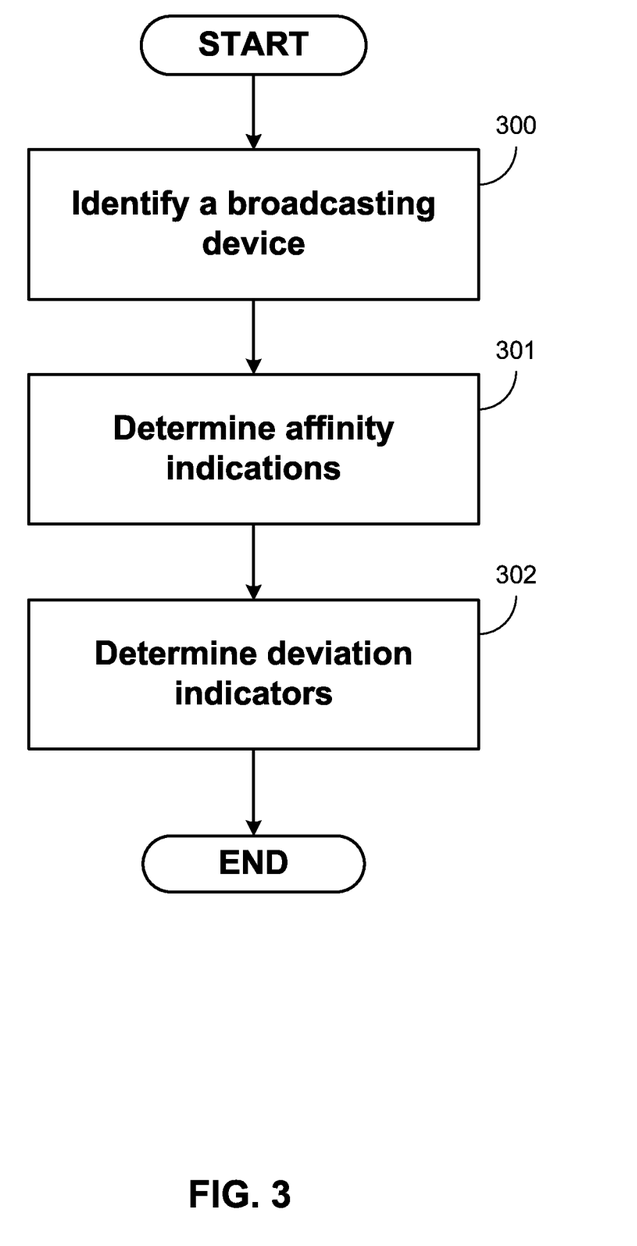
FIG. 3 is a flow-chart diagram of a broadcast deviation identification program, in accordance with at least one embodiment of the present invention.

FIG. 3 is a flow-chart diagram of a broadcast deviation identification program, in accordance with at least one embodiment of the present invention. At step 300, the program identifies a broadcasting device, where the broadcasting device operates via a short-range wireless communication protocol. At step 301, the program determines one or more affinity indications associated with the broadcasting device. At step 302, the program determines one or more deviation indicators based on the one or more affinity indications, where the one or more deviation indicators are associated with the broadcasting device.

In some embodiments, responsive to at least one of the one or more deviation indicators indicating that the broadcasting device exhibits at least one property that is different from one or more primary predetermined properties (i.e., one or more properties expected to be true of the broadcasting device, determined for instance based on one or more pieces of prior information and/or one or more pieces of prior assumptions), the broadcast deviation identification program marks the broadcasting device as having an exceptional status. In some of those embodiments, marking the broadcasting device as having the exceptional status comprises marking the broadcasting device as having a modified status if the broadcasting device exhibits a behavioral pattern that satisfies at least one of one or more secondary predetermined property criteria, and marking the broadcasting device as having an unknown status if the broadcasting device exhibits a behavioral pattern that fails to satisfy at least one of the one or more secondary predetermined property criteria. In at least some embodiments, the one or more secondary predetermined property criteria is determined based on one or more secondary predetermined properties. A secondary predetermined property is a property expected to be true of one or more additional broadcasting devices present in the computing environment in which the present invention is implemented, where the one or more additional broadcasting devices are different from the identified broadcasting device and/or are not in a same grouping of broadcasting devices as the identified broadcasting device. In some embodiments, the program determines that the broadcasting device exhibits at least one property that is different from one or more primary predetermined properties associated with the broadcasting device when the program and/or the application software fail to receive a communication indication caused to be sent by the broadcasting device. In some embodiments, the program determines that the broadcasting device exhibits at least one property that is different from one or more primary predetermined properties associated with the broadcasting device when the program fails to determine an affinity indication associated with the broadcasting device.

In at least some of those embodiments, if the broadcasting device exhibits a property that is different from one or more primary predetermined properties associated with the broadcasting device, the broadcasting device is marked as having an exceptional status. In some embodiments, the exceptional status associated with the broadcasting device may take one of two forms: a modified status (such as the "Moved" status used in a location-based analysis, as explained below) and an unknown status. In at least some of those embodiments, the broadcast deviation identification program marks a broadcasting device as having a modified status if the broadcasting device exhibits a required level of similarity in properties (e.g., 80 percent similarity and/or similarity in the combination of a location-based property and a temperature-based property) similar to one or more broadcasting devices present in the computing environment in which the present invention is implemented that are different from the identified broadcasting device and/or are not in a same grouping of broadcasting devices as the identified broadcasting device (i.e., the secondary broadcasting devices).

In some embodiments, the one or more primary predetermined properties are associated with at least one primary device grouping (i.e., a grouping of one or more broadcasting devices to which the identified broadcasting device belongs) and the one or more secondary predetermined property are associated with at least one secondary device grouping (i.e., a grouping of one or more broadcasting devices to which the identified broadcasting device does not belong). In at least some of those embodiments, if the broadcasting device exhibits at least one property that is different from one or more properties expected to be true of the members of at least one primary device grouping, the broadcast deviation identification program marks the broadcasting device as having an exceptional status. In some of those embodiments, if the broadcasting device exhibits a behavioral pattern that satisfies at least one of the property criteria determined based on one or more properties expected to be true of the members of at least one secondary device grouping, the program marks the broadcasting device as having a modified status; if the broadcasting device does not exhibit a behavioral pattern that satisfies at least one of the property criteria determined based on one or more properties expected to be true of the members of at least one secondary device grouping, the program marks the broadcasting device as having an unknown status.

In some embodiments, determining the one or more affinity indications comprises receiving, on an application software computer platform, one or more communication indications from the broadcasting device; and communicating an indication of each of said one or more communication indications to a server computer. In some embodiments, determining the one or more deviation indicators comprises determining one or more primary exhibited properties based on the one or more affinity indications; determining one or more primary predetermined properties; and determining whether the one or more primary exhibited properties are in accordance with the one or more primary predetermined properties based on a predetermined level of required similarity (e.g., 80 percent similarity and/or similarity in the combination of a location-based property and a temperature-based property).

Figure 4A:
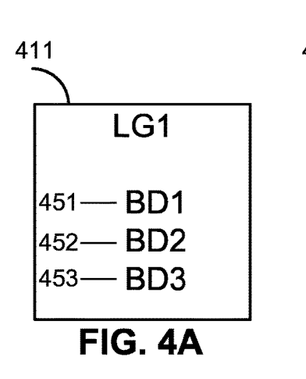
FIGS. 4A, 4B, and 4C depict data for an operational example of three location-based groupings of broadcasting devices, in accordance with at least one embodiment of the present invention.
Figure 4B:
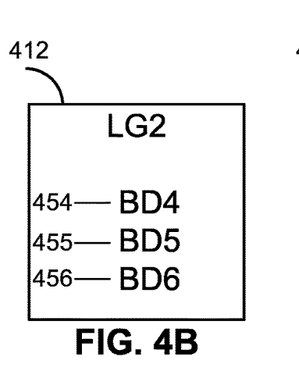
Figure 4C:
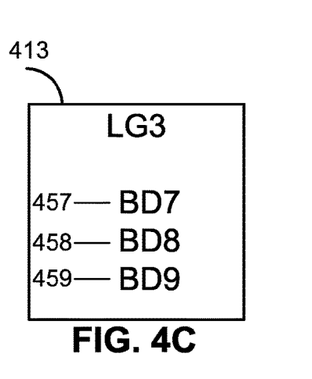

FIGS. 4A, 4B, and 4C are operational examples of three location-based groupings of broadcasting devices, in accordance with at least one embodiment of the present invention. In the embodiment depicted in FIGS. 4A, 4B, and 4C, the grouping of broadcasting devices are based on a location-based property (i.e., members of each grouping are expected to belong to a shared location region). FIG. 4A depicts the location grouping LG1 411, which includes three broadcasting devices: BD1 451, BD2 452, and BD3 453. FIG. 4B depicts the location grouping LG2 412, which includes three broadcasting devices: BD4 454, BD5 455, and BD6 456. FIG. 4C depicts the location grouping LG3 413, which includes three broadcasting devices: BD7 457, BD8 458, and BD9 459.

Figure 5:
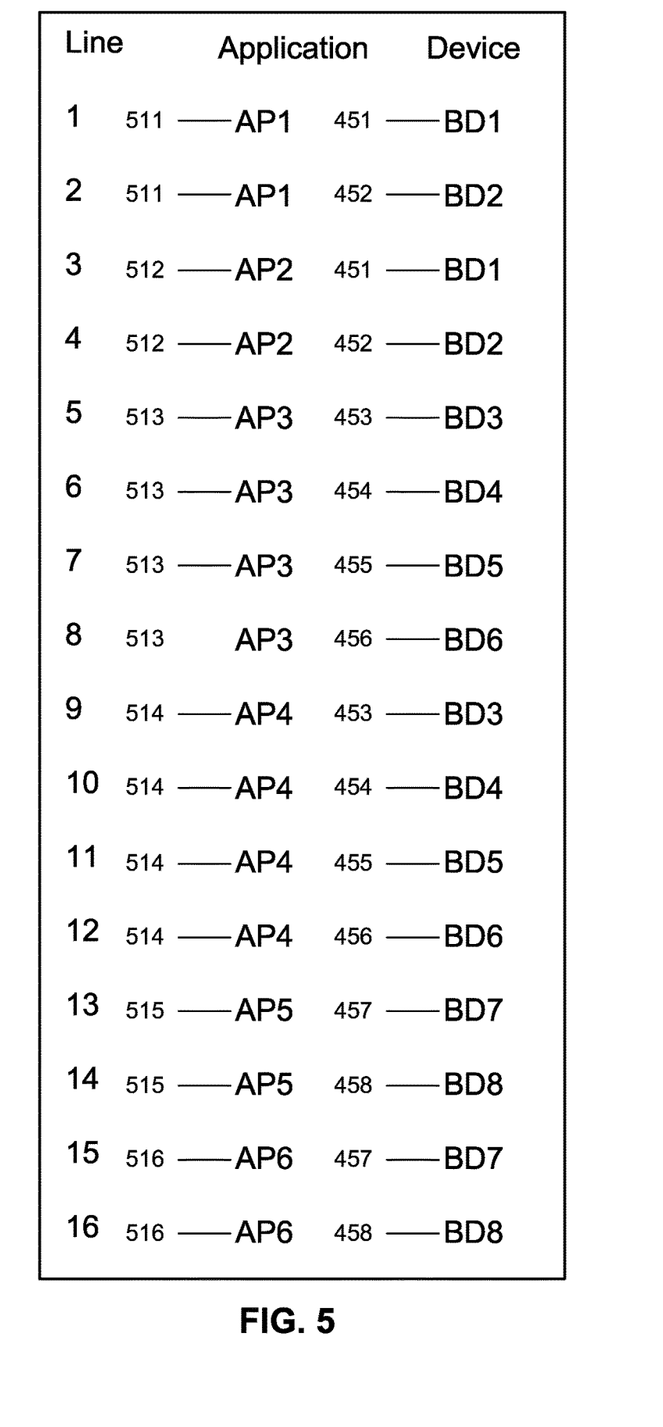
FIG. 5 depicts data for an operational example of a record of a number of affinity indications, in accordance with at least one embodiment of the present invention.

FIG. 5 is an operational example of a record of a number of affinity indications, in accordance with at least one embodiment of the present invention. In the embodiment depicted in FIG. 5, each line of the record represents an affinity indication. The affinity indications depicted in FIG. 5 are all recorded within an amount of time that is less than or equal to a predetermined threshold amount of time (e.g., 1 minute) used to determine whether two affinity indication are related to one another (e.g., if affinity indication $AI_1$ has an associated time indication $t_1$ and affinity indication $AI_2$ has an associated time indication $t_2$, then affinity indication $AI_1$ and the affinity indication $AI_2$ are determined to be related only if the difference between the time value represented by time indication $t_1$ and the time value represented by time indication $t_2$ is less than the predetermined threshold amount of time).

In the embodiment depicted in FIG. 5, affinity indications on line 1 and 2 show that the broadcast deviation identification program has determined that software application AP1 511 has received one or more communications indications from broadcasting device BD1 451 (as noted on the affinity indication on line 1) and the broadcasting device BD2 452 (as noted on the affinity indication on line 2). The affinity indications on line 3 and 4 show that the broadcast deviation identification program has determined that software application AP2 512 has received one or more communications indications from each of broadcasting device BD1 451 (as noted on the affinity indication on line 3) and the broadcasting device BD2 452 (as noted on the affinity indication on line 4).

In the embodiment depicted in FIG. 5, the affinity indications on lines 5, 6, 7, and 8 show that the broadcast deviation identification program has determined that software application AP3 513 has received one or more communications indications from each of the broadcasting device BD3 453 (as noted on line 5), the broadcasting device BD4 454 (as noted on line 6), the broadcasting device BD5 455 (as noted on line 7), and the broadcasting device BD6 456 (as noted on line 8). The affinity indications on lines 9, 10, 11, and 12 show that the broadcast deviation identification program has determined that software application AP4 514 has received one or more communications indications from each of the broadcasting device BD3 453 (as noted on line 9), the broadcasting device BD4 454 (as noted on line 10), the broadcasting device BD5 455 (as noted on line 11), and the broadcasting device BD6 456 (as noted on line 12).

In the embodiment depicted in FIG. 5, the affinity indications on line 13 and 14 show that the broadcast deviation identification program has determined that software application AP5 515 has received one or more communication indications from each of the broadcasting device BD7 457 (as noted on line 13) and BD8 458 (as noted on line 14). The affinity indications on line 15 and 16 show that the broadcast deviation identification program has determined that software application AP6 516 has indicated that it has received one or more communication indications from each of the broadcasting device BD7 457 (as noted on line 15) and BD8 458 (as noted on line 16).

Figure 6:
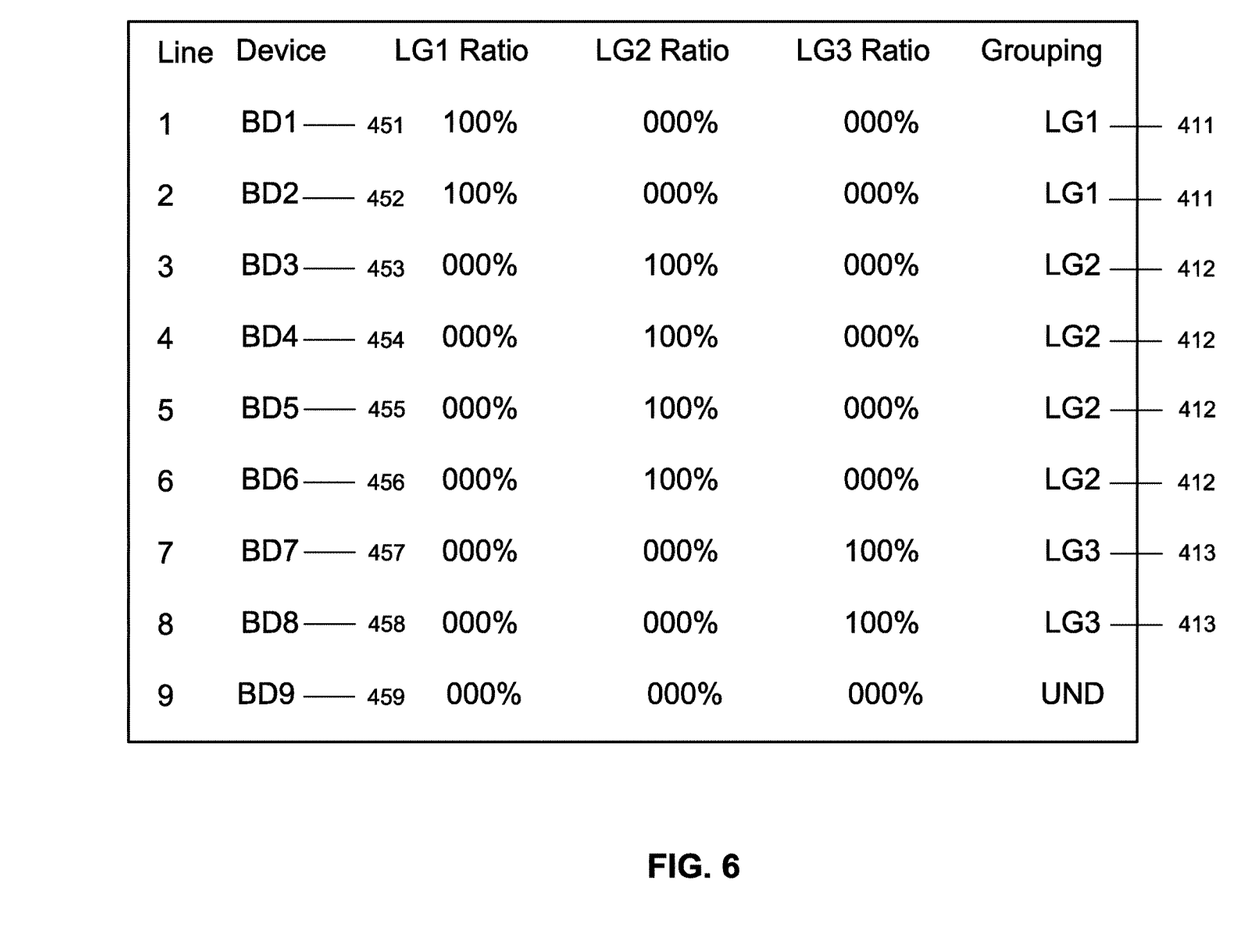
FIG. 6 depicts data for an operational example of primary exhibited property determination, in accordance with at least one embodiment of the present invention.

FIG. 6 is an operational example of primary exhibited behavior determination, in accordance with at least one embodiment of the present invention. In the embodiment depicted in FIG. 6, each line of the table indicates the association ratio between a broadcasting device and the location groupings LG1 411 (indicated in the column named "LG1 Ratio"), LG2 412 (indicated in the column named "LG2 Ratio") and LG3 413 (indicated in the column named "LG3 Ratio"). The association ratios indicated in FIG. 6 are determined based on the affinity indications depicted in FIG. 6. In the embodiment depicted in FIG. 6, each line of the table also indicates a location grouping-based primary exhibited property associated with each broadcasting device (indicated in the column named "Grouping"), where the primary exhibited property is determined based on the association ratios between a broadcasting device and the location groupings LG1 411 (indicated in the column named "LG1 Ratio"), LG2 412 (indicated in the column named "LG2 Ratio") and LG3 413 (indicated in the column named "LG3 Ratio").

In the embodiment depicted in FIG. 6, line 1 of the table indicates that broadcasting device BD1 451 has 100% association with location grouping LG1 411, 0% association with location grouping LG2 412, and 0% association with location grouping LG3 413. Therefore, the broadcast deviation identification program determines that the broadcasting device BD1 451 is associated with a primary exhibited property of belonging to location grouping LG1 411. Line 2 of the table indicates that broadcasting device BD2 452 has 100% association with location grouping LG1 411, 0% association with location grouping LG2 412, and 0% association with location grouping LG3 413. Therefore, the broadcast deviation identification program determines that the broadcasting device BD2 452 is associated with a primary exhibited property of belonging to location grouping LG1 411.

In the embodiment depicted in FIG. 6, lines 3, 4, 5, and 6 of the table indicate that the broadcasting devices BD3 453, BD4 454, BD5 455, and BD6 456 have 0% association with location grouping LG1 411, 100% association with location grouping LG2 412, and 0% association with location grouping LG3 413. Therefore, the broadcast deviation identification program determines that the broadcasting devices BD3 453, BD4 454, BD5 455, and BD6 456 are associated with a primary exhibited behavior of belonging to location grouping LG2 412. Lines 7, 8, and 9 of the table indicate that the broadcasting devices BD7 457 and BD8 458 have 0% association with location grouping LG1 411, 0% association with location grouping LG2 412, and 100% association with location grouping LG3 413. Therefore, the broadcast deviation identification program determines that the broadcasting devices BD7 457 and BD8 458 are associated with a primary exhibited behavior of belonging to location grouping LG3 413.

In the embodiment depicted in FIG. 6, line 9 of the table indicates that the broadcasting device BD9 459 has 0% association with location grouping LG1 411, 0% association with location grouping LG2 412, and 0% association with location grouping LG3 413. Therefore, the broadcast deviation identification program determines that broadcasting device BD9 459 does not belong to any of the three location groupings in the computer system environment in which the present invention is implemented (i.e., location grouping LG1 411, location grouping LG2 412, and location grouping LG3 413). This primary exhibited behavior associated with the broadcasting device BD9 459 is marked with the keyword "UND" (denoting belonging to an undefined location grouping) in the table depicted in FIG. 6.

Figure 7:
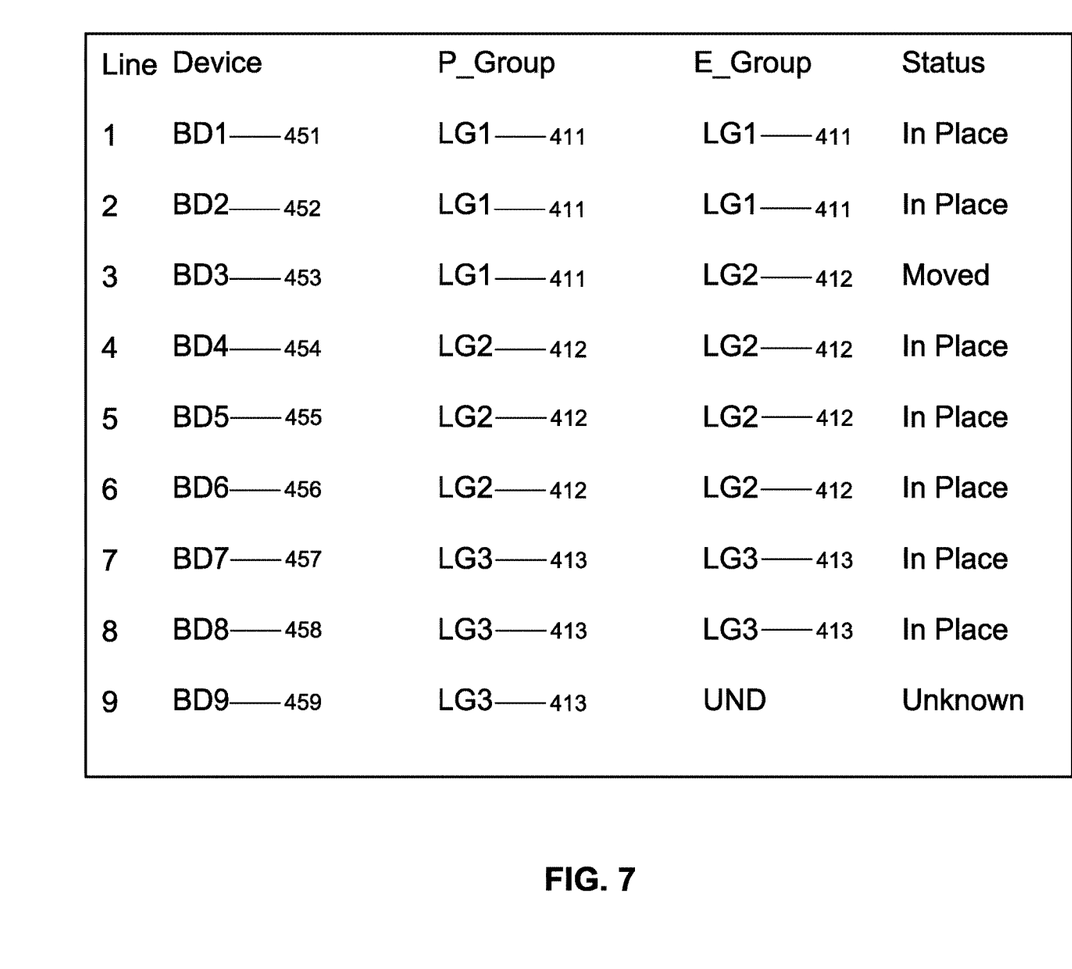
FIG. 7 depicts data for an operational example of broadcasting device status determination, in accordance with at least one embodiment of the present invention.

FIG. 7 is an operational example of broadcasting device status determination, in accordance with at least one embodiment of the present invention. In the embodiment depicted in FIG. 7, each line of the table indicates a location grouping-based primary predetermined property (indicated in the column named "P_Group") associated with a broadcasting device and a location grouping-based primary exhibited property (indicated in the column named "E_Group") associated with the broadcasting device. In the embodiment depicted in FIG. 7, each line of the table further indicates the operational status (indicated in the column named "Status") associated with the broadcasting device.

In the embodiment depicted in FIG. 7, line 1, 2, 4, 5, 6, 7, and 8 of the table indicate that broadcasting devices BD1 451, BD2 452, BD4 454, BD5 455, BD6 456, BD7 457, and BD8 458 are associated with a location grouping-based primary predetermined property that is the same as the location grouping-based primary exhibited associated with each of those broadcasting devices. As such, the broadcast deviation identification program marks the broadcasting devices BD1 451, BD2 452, BD4 454, BD5 455, BD6 456, BD7 457, and BD8 458 as having an "In Place" operational status (i.e., not an exceptional status, as explained above).

In the embodiment depicted in FIG. 7, line 3 of the table indicates that broadcasting device BD3 453 is associated with a location grouping-based primary predetermined property (i.e., belonging to location grouping LG1 411) that is different from the location grouping-based primary exhibited property (i.e., belonging to location grouping LG2 412) that the broadcasting device BD3 453 is associated with. As such, the broadcast deviation identification program marks the broadcasting device BD3 453 as having a "Moved" status (i.e., an example of a modified status explained above).

In the embodiment depicted in FIG. 7, line 9 of the table indicates that broadcasting device BD9 459 is associated with a location grouping-based primary exhibited property marked as undefined. As such, the broadcast deviation identification program determines that that broadcasting device BD9 45 does not exhibit a property indicating membership in any location grouping present in the computer system environment in which the present invention is implemented, and marks the broadcasting device BD9 459 as having an "Unknown" status (i.e., an example of an unknown status explained above).

In some embodiments, an affinity indication comprises one or more elements selected from the group consisting of one or more broadcasting device identifying indications (e.g., one or more broadcasting device IDs), one or more application software identifying indications (e.g., one or more application software IDs), one or more application software platform computer identifying indications (e.g., one or more application software platform computer IDs), one or more time indications (e.g., one or more time stamps), and one or more informational indications (e.g., one or more pieces of data about the affinity indication). In some embodiments, the broadcast deviation identification program uses at least one of the following to determine one or more primary exhibited properties (e.g., one or more location-based properties) associated with the broadcasting device and/or one or more deviation indicators associated with the broadcasting device: (i) one or more time indications associated with each affinity indication associated with the broadcasting device; and (ii) one or more informational indications associated with the broadcasting indications. In an exemplary embodiment, the program uses one or more information contained in one or more informational indications (e.g., one or more pieces of measurement information, such as one or more pieces of temperature information) to determine one or more primary exhibited properties associated with the broadcasting device and/or one or more deviation indicators associated with the broadcasting device. In some embodiments, the program determines two affinity indications to be related to each other if they were determined (e.g., their respective one or more time indications were different by an amount of time less than or equal to) a predetermined threshold amount of time (e.g., 40 seconds). In at least some embodiments, the program does not collectively consider unrelated affinity indications in determining one or more primary exhibited properties associated with the broadcasting device and/or one or more deviation indicators associated with the broadcasting device.

In some embodiments, the broadcast deviation identification program determines one or more primary exhibited properties associated with the broadcasting device and/or one or more deviation indicators associated with the broadcasting device if one or more observed properties and/or one or more observed behavioral patterns associated with the broadcasting device conform to one or more expected properties and/or one or more expected behavioral patterns associated with the broadcasting device by a conformity ratio and/or probability ratio exceeding a predetermined conformity threshold ratio and/or a predetermined probability threshold ratio (a predetermined conformity threshold ratio and/or predetermined probability threshold ratio of 90%).

In some embodiments, one or more primary exhibited properties associated with the broadcasting device indicate that the broadcasting device is associated with one or more (e.g., property-based) broadcasting device groupings (e.g., one or more location-based broadcasting device groupings and/or one or more temperature-based broadcasting device groupings). In some embodiments, determining one or more affinity indications associated with the broadcasting device and/or one or more deviation indicators associated with the broadcasting device comprises communicating with one or more event processing computer (hardware and/or software) components. In at least some of those embodiments, the one or more event processing computer (hardware and/or software) components receive one or more communication indications associated with the broadcasting device and/or analyze one or more affinity indications associated with the broadcast device.

In some embodiments, the broadcast deviation identification program and/or the one or more event processing computer (hardware and/or software) components analyze, using one or more smoothing algorithms, one or more properties and/or one or more behavioral patterns associated with: (i) one or more broadcasting devices associated with one or more broadcasting device groupings; and/or (ii) one or more broadcasting devices associated with one or more properties and/or one or more behavioral patterns indicating that the broadcasting devices are at the boundary of one or more broadcasting device groupings. In some embodiments, the broadcast deviation identification program uses the total number of one or more communications indications associated with the broadcasting device caused to be sent within a predetermined period of time (e.g., 30 seconds) and/or one or more comparisons of total number of communication indications caused to be sent within a predetermined period of time by each of two or more broadcasting devices to determine one or more primary exhibited properties associated with the identified broadcasting device and/or one or more deviation indicators associated with the identified broadcasting device.

The broadcast deviation identification program identifies a broadcasting device operating via a short-range wireless communication protocol at step 300. In at least some embodiments, a broadcasting device is any device that can, during normal and non-exceptional operations, communicate with other computer (software and/or hardware) components via at least one short-range wireless communication protocol, and/or operate via at least one short-range wireless communication protocol. In some embodiments, the short-range wireless communication protocol comprises at least one Bluetooth-based protocol. In some embodiments, the short-range wireless communication protocol comprises a combination of one or more protocols selected from the group consisting of a Bluetooth-based protocol (including a classic Bluetooth protocol and a Bluetooth Low Energy protocol), a radio frequency identification (RFID) protocol, a near-field communication (NFC) protocol, and a Wi-Fi protocol. In some embodiments, a short-range wireless communication protocol is any protocol for communication of one or more pieces of information within smaller ranges (e.g., 100 meters or 328 feet).

The broadcast deviation identification program determines one or more affinity indications at step 301. In at least some embodiments, an affinity indication is any indication that, in whole or in part and directly or indirectly, indicates that a broadcasting device and one or more pieces of application software have communicated with each other and/or have transmitted any one or more pieces of information to each other. In at least some embodiments, an affinity indication is any indication that, in whole or in part and directly or indirectly, can give one or more pieces of information about property associated with a broadcasting device. In some embodiments, an affinity indication comprises one or more elements selected from the group consisting of one or more broadcasting device identifying indications (e.g., one or more broadcasting device IDs), one or more application software identifying indications (e.g., one or more application software IDs), one or more application software platform computer identifying indications (e.g., one or more application software platform computer IDs), one or more time indications (e.g., one or more time stamps), and one or more informational indications (e.g., one or more pieces of data about the affinity indication).

In some embodiments, an affinity indication comprises one or more indications of one or more associations between one or more broadcasting device identifying indications (e.g., one or more broadcasting device IDs) and one or more application software identifying indications (e.g. one or more application software IDs) and/or one or more application software platform computer identifying indications (e.g., one or more application software platform computer IDs). In some embodiments, an affinity indication comprises one or more indications of one or more measurements communicated by the broadcasting device to one or more pieces of application software and/or one or more application software platform computers. In some of those embodiments, a measurement comprises one or more indications selected from the group consisting of one or more pieces of temperature information, one or more pieces of acoustic information, one or more pieces of speed information, one or more pieces of acceleration information, one or more pieces of information concerning brightness of one or more ambient environments, and one or more pieces of other sensor or beacon measurement information. In some embodiments, an affinity indication comprises one or more indications of a time in which a communication of one or more measurements by the broadcasting device to one or more pieces of application software and/or one or more application software platform computers was made.

In some embodiments, determining one or more affinity indications comprises receiving one or more affinity indications (e.g., from the broadcasting device) and/or one or more communication indications (e.g., from the broadcasting device). In some embodiments, determining one or more affinity indications comprises analyzing and/or processing one or more communications indications (e.g., from the broadcasting device). In some embodiments, the program determines one or more affinity indications associated with the broadcasting device based on factors in addition to contents of one or more communication indications (e.g., time, rate of traffic in the computer system environment in which the present invention is implemented, and/or one or more pieces of historical data and/or statistical information about the computer system environment in which the present invention is implemented).

The broadcast deviation identification program determines one or more deviation indicators at step 302. In at least some embodiments, a deviation indicator is any indicator that, in whole or in part and directly or indirectly, indicates one or more pieces of information about whether a broadcasting device exhibits behavior that is different from any one or more of its expected (i.e., predetermined) behaviors and/or expected (i.e., predetermined) properties. In some embodiments, a deviation indicator comprises one or more pieces of information about the operating status associated with the broadcasting device (e.g., indicating whether the broadcasting device is having an exceptional, modified, and/or unknown status). In some embodiments, determining one or more deviation indicators comprises analyzing and/or processing one or more communication indications (e.g., from the broadcasting device) and/or one or more affinity indications (e.g., associated with the broadcasting device). In some embodiments, the program determines one or more affinity indications associated with the broadcasting device based on factors in addition to contents of one or more affinity indications and/or one or more communication indications (e.g., time, rate of traffic in the computer system environment in which the present invention is implemented, and/or one or more pieces of historical data and/or statistical information about the computer system environment in which the present invention is implemented).

In some embodiments, the one or more primary predetermined properties comprises at least one location-based property. In some embodiments, the one or more predetermined properties comprise one or more non-location-based properties, such as one or more temperature-based properties and/or one or more other properties that report information specific to a particular kind of broadcasting device. While some of the examples referenced herein describe the present invention with reference to one or more location-based properties, a person of ordinary skill in the art readily appreciates that the present invention may be implemented with respect to one or more other properties of other types (such as one or more temperature-based properties and/or one or more other properties that report information specific to a particular kind of broadcasting device). In some embodiments, the broadcast deviation identification program validates (i.e., confirms to be accurate) one or more primary predetermined properties associated with the broadcasting device.

In general, one or more steps of different embodiments of the broadcast deviation identification program may be performed based on one or more pieces of information obtained directly or indirectly from one or more computer (hardware or software) components, one or more pieces of information obtained directly or indirectly from one or more inputs from one or more users, and/or one or more observed behaviors associated with one or more (hardware or software) components of one or more computer system environments. In general, one or more steps of different embodiments of the broadcast deviation identification program may comprise communicating with one or more computer (hardware or software) components, issuing one or more computer instructions (e.g., one or more special purpose machine-level instructions defined in the instruction set of one or more computer hardware components), and/or communicating with one or more computer components at the hardware level.

Aspects of the present invention allow for detection of modification and/or defection in the operational status of one or more broadcasting devices operating via at least one short-range wireless communication protocol without the need for individual inspection of the one or more broadcasting devices, in return reducing the costs associated with detection of modification and/or defection in the operational status of the one or more broadcasting devices. In addition, the information gathered through the operation of the broadcast deviation identification program can be used to monitor and/or improve the computer system environment in which the present invention is implemented. Nevertheless, the aforementioned advantages are not required to be present in all of the embodiments of the invention and may not be present in all of the embodiments of the invention.

Figure 8:
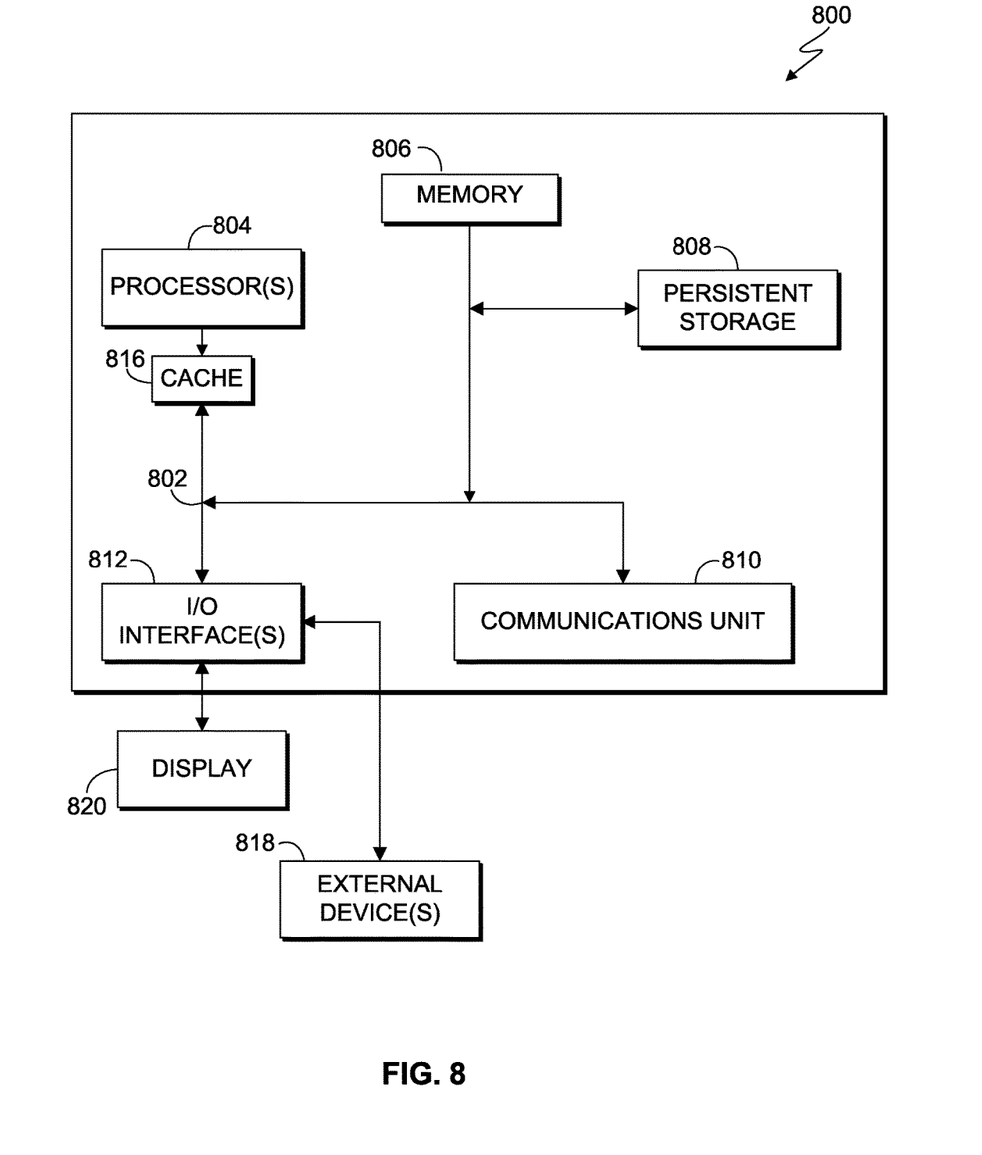
FIG. 8 is a block diagram of a computing apparatus suitable for executing a broadcast deviation identification program, in accordance with at least one embodiment of the present invention.

FIG. 8 is a block diagram depicting components of a computer 800 suitable for executing the broadcast deviation identification program. FIG. 8 displays the computer 800, the one or more processor(s) 804 (including one or more computer processors), the communications fabric 802, the memory 806, the RAM, the cache 816, the persistent storage 808, the communications unit 810, the I/O interfaces 812, the display 820, and the external devices 818. It should be appreciated that FIG. 8 provides only an illustration of one embodiment and does not imply any limitations with regard to the environments in which different embodiments may be implemented. Many modifications to the depicted environment may be made.

As depicted, the computer 800 operates over a communications fabric 802, which provides communications between the cache 816, the computer processor(s) 804, the memory 806, the persistent storage 808, the communications unit 810, and the input/output (I/O) interface(s) 812. The communications fabric 802 may be implemented with any architecture suitable for passing data and/or control information between the processors 804 (e.g., microprocessors, communications processors, and network processors, etc.), the memory 806, the external devices 818, and any other hardware components within a system. For example, the communications fabric 802 may be implemented with one or more buses or a crossbar switch.

The memory 806 and persistent storage 808 are computer readable storage media. In the depicted embodiment, the memory 806 includes a random access memory (RAM). In general, the memory 806 may include any suitable volatile or non-volatile implementations of one or more computer readable storage media. The cache 816 is a fast memory that enhances the performance of computer processor(s) 804 by holding recently accessed data, and data near accessed data, from memory 806.

Program instructions for the broadcast deviation identification program may be stored in the persistent storage 808 or in memory 806, or more generally, any computer readable storage media, for execution by one or more of the respective computer processors 804 via the cache 816. The persistent storage 808 may include a magnetic hard disk drive. Alternatively, or in addition to a magnetic hard disk drive, the persistent storage 808 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 808 may also be removable. For example, a removable hard drive may be used for persistent storage 808. Other examples include optical and magnetic disks, thumb drives, and smart cards that are inserted into a drive for transfer onto another computer readable storage medium that is also part of the persistent storage 808.

The communications unit 810, in these examples, provides for communications with other data processing systems or devices. In these examples, the communications unit 810 may include one or more network interface cards. The communications unit 810 may provide communications through the use of either or both physical and wireless communications links. The broadcast deviation identification program may be downloaded to the persistent storage 808 through the communications unit 810. In the context of some embodiments of the present invention, the source of the various input data may be physically remote to the computer 800 such that the input data may be received and the output similarly transmitted via the communications unit 810.

The I/O interface(s) 812 allows for input and output of data with other devices that may operate in conjunction with the computer 800. For example, the I/O interface 812 may provide a connection to the external devices 818, which may include a keyboard, keypad, a touch screen, and/or some other suitable input devices. External devices 818 may also include portable computer readable storage media, for example, thumb drives, portable optical or magnetic disks, and memory cards. Software and data used to practice embodiments of the present invention may be stored on such portable computer readable storage media and may be loaded onto the persistent storage 808 via the I/O interface(s) 812. The I/O interface(s) 812 may similarly connect to a display 820. The display 820 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   identifying a broadcasting device, said broadcasting device operating via a short-range wireless communication protocol;
   determining one or more affinity indications, said one or more affinity indications being associated with said broadcasting device;
   determining one or more deviation indicators based on said one or more affinity indications, said one or more deviation indicators being associated with said broadcasting device;
   responsive to at least one of said one or more deviation indicators indicating that said broadcasting device exhibits at least one property that is different from one or more primary predetermined properties, marking said broadcasting device as having an exceptional status;
   marking said broadcasting device as having an exceptional status;
   marking said broadcasting device as having a modified status if said broadcasting device exhibits a behavioral pattern that satisfies at least one of one or more secondary predetermined property criteria; and
   marking said broadcasting device as having an unknown status if said broadcasting device exhibits a behavioral pattern that fails to satisfy at least one of said one or more secondary predetermined property criteria.

2. The computer-implemented method of claim 1, wherein determining said one or more affinity indications further comprises:
   receiving, on an application software computer platform, one or more communication indications from said broadcasting device; and
   communicating an indication of each of said one or more communication indications to a server computer.

3. The computer-implemented method of claim 1, wherein determining said one or more deviation indicators further comprises:
   determining one or more primary exhibited properties based on said one or more affinity indications;
   determining one or more primary predetermined properties; and
   determining whether said one or more primary exhibited properties are in accordance with said one or more primary predetermined properties based on a predetermined level of required similarity.

4. The computer-implemented method of claim 1, wherein said one or more primary predetermined properties comprises at least one location-based property.

5. The computer-implemented method of claim 1, wherein:
   said one or more primary predetermined properties are associated with at least one primary device grouping; and
   said one or more secondary predetermined property criteria are associated with at least one secondary device grouping.

6. A computer program product, comprising one or more computer readable storage media and program instructions stored on said one or more computer readable storage media, said program instructions comprising instructions to:
   identify a broadcasting device, said broadcasting device operating via a short-range wireless communication protocol;
   determine one or more affinity indications, said one or more affinity indications being associated with said broadcasting device; and
   determine one or more deviation indicators based on said one or more affinity indications, said one or more deviation indicators being associated with said broadcasting device;
   responsive to at least one of said one or more deviation indicators indicating that said broadcasting device exhibits at least one property that is different from one or more primary predetermined properties, marking said broadcasting device as having an exceptional status;
   marking said broadcasting device as having an exceptional status;
   marking said broadcasting device as having a modified status if said broadcasting device exhibits a behavioral pattern that satisfies at least one of one or more secondary predetermined property criteria; and
   marking said broadcasting device as having an unknown status if said broadcasting device exhibits a behavioral pattern that fails to satisfy at least one of said one or more secondary predetermined property criteria.

7. The computer program product of claim 6, wherein said instructions to determine said one or more affinity indications further comprises instructions to:
   receive, on an application software computer platform, one or more communication indications from said broadcasting device; and
   communicate an indication of each of said one or more communication indications to a server computer.

8. The computer program product of claim 6, wherein said instructions to determine said one or more deviation indicators further comprise instructions to:
   determine one or more primary exhibited properties based on said one or more affinity indications;
   determine one or more primary predetermined properties; and
   determine whether said one or more primary exhibited properties are in accordance with said one or more primary predetermined properties based on a predetermined level of required similarity.

9. The computer program product of claim 6, wherein said one or more primary predetermined properties comprises at least one location-based property.

10. The computer program product of claim 6, wherein:
    said one or more primary predetermined properties are associated with at least one primary device grouping; and
    said one or more secondary predetermined property criteria are associated with at least one secondary device grouping.

11. A computer system comprising:
    a processor;
    one or more computer readable storage media;
    computer program instructions;
    said computer program instructions being stored on said one or more computer readable storage media; and
    said computer program instructions comprising instructions to:
    identify a broadcasting device, said broadcasting device operating via a short-range wireless communication protocol;
    determine one or more affinity indications, said one or more affinity indications being associated with said broadcasting device; and determine one or more deviation indicators based on said one or more affinity indications, said one or more deviation indicators being associated with said broadcasting device;

responsive to at least one of said one or more deviation indicators indicating that said broadcasting device exhibits at least one property that is different from one or more primary predetermined properties, marking said broadcasting device as having an exceptional status;

marking said broadcasting device as having an exceptional status;

marking said broadcasting device as having a modified status if said broadcasting device exhibits a behavioral pattern that satisfies at least one of one or more secondary predetermined property criteria;

marking said broadcasting device as having an unknown status if said broadcasting device exhibits a behavioral pattern that fails to satisfy at least one of said one or more secondary predetermined property criteria.

12. The computer system of claim 11, wherein said instructions to determine said one or more affinity indications further comprises instructions to:

receive, on an application software computer platform, one or more communication indications from said broadcasting device; and communicate an indication of each of said one or more communication indications to a server computer.

13. The computer system of claim 11, wherein said instructions to determine said one or more deviation indicators further comprise instructions to:

determine one or more primary exhibited properties based on said one or more affinity indications;

determining one or more primary predetermined properties; and determine whether said one or more primary exhibited properties are in accordance with said one or more primary predetermined properties based on a predetermined level of required similarity.

14. The computer system of claim 11, wherein:

said one or more primary predetermined properties are associated with at least one primary device grouping; and said one or more secondary predetermined property criteria are associated with at least one secondary device grouping.

* * * * *